W. E. URSCHEL.
APPARATUS FOR SNIPPING STRING BEANS.
APPLICATION FILED JAN. 22, 1920.

1,336,991.

Patented Apr. 13, 1920.
5 SHEETS—SHEET 3.

INVENTOR
William E. Urschel
BY
ATTORNEY

UNITED STATES PATENT OFFICE.

WILLIAM E. URSCHEL, OF VALPARAISO, INDIANA.

APPARATUS FOR SNIPPING STRING-BEANS.

1,336,991.    Specification of Letters Patent.    Patented Apr. 13, 1920.

Application filed January 22, 1920. Serial No. 353,185.

*To all whom it may concern:*

Be it known that I, WILLIAM E. URSCHEL, a citizen of the United States, residing at Valparaiso, in the county of Porter and State of Indiana, have invented a new and useful Improvement in Apparatus for Snipping String-Beans, of which the following is a specification.

My present invention is an improvement upon the apparatus described in my Patent No. 1,256,492 of February 12, 1918, a knowledge of the construction and mode of operation of which is herein assumed for the sake of avoiding useless repetition. In that patent, I describe a stationary knife coöperating with the cylindrical surface of the cylinder to sever the bean ends. There was also described a moving knife which did not, however, touch the rotating cylindrical surface but coacted with a stationary counter-cutting surface placed near the rotating cylindrical surface. I have now discovered that I may use a moving or reciprocating knife in actual shearing contact with the outer surface of the rotating cylinder without having the two motions of knife and cylindrical-surface, which are at right angles, interfere with each other. In this way I produce a much cleaner cut in the operation of severing the ends of the green beans, more especially when these are stringy, either because they have been grown from the stringy type of seed or because they have been made stringy by the weather.

Another improvement consists in the shape of the gaging or snipping perforations in the walls of the rotary drum, through which perforations the beans protrude before they are snipped. The perforations shown in my patent are in the form of longitudinal slots and have the disadvantage that the beans may fall down lengthwise into them and thus have their sides as well as their ends clipped. Although a simple square or round aperture is practicable, I have found that several such apertures connected by a slot or slots are peculiarly effective, since the slot affords an opening through which the short stems of the beans, which often remain attached to them, may slip without permitting a passage of the bean end itself.

I have also much improved the mechanical construction of the snipping drum, building this from a series of individual pockets each, generally speaking, of a dimension less than the length of the bean to be treated therein, the outer, perforated and curved surface of each pocket constituting, when assembled, a part of the cylindrical surface. I put a large number of these pockets, end to end, and assemble them preferably in a helical form, the adjacent turns or coils of the helix of pockets clamping between their vertical walls an Archimedean screw, which acts as a feed for the beans. I have also much improved the interior shape of this pocket in extremely important particulars so that the beans can more readily protrude through the snipping apertures. Finally I have devised a simple frame for supporting and driving the cylinder and reciprocating knife.

I shall begin by describing the individual pockets of which the snipping cylinder is built, whereupon I shall describe how the cylinder is built up from these pockets and shall conclude by setting forth the construction of the frame on which the cylinder is mounted, the reciprocating knives carried thereby and the driving mechanism for the parts.

Figure 4:
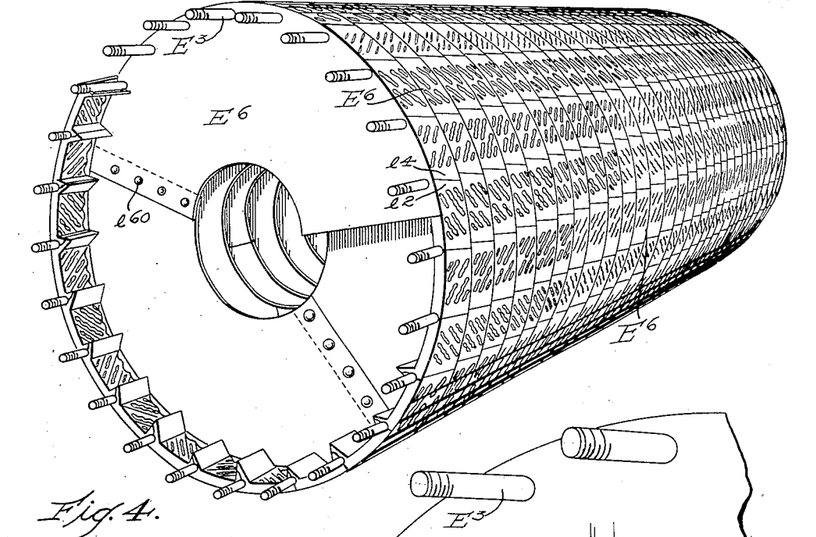
Fig. 4 shows a drum partially built.
Figures 6, 7, 8:
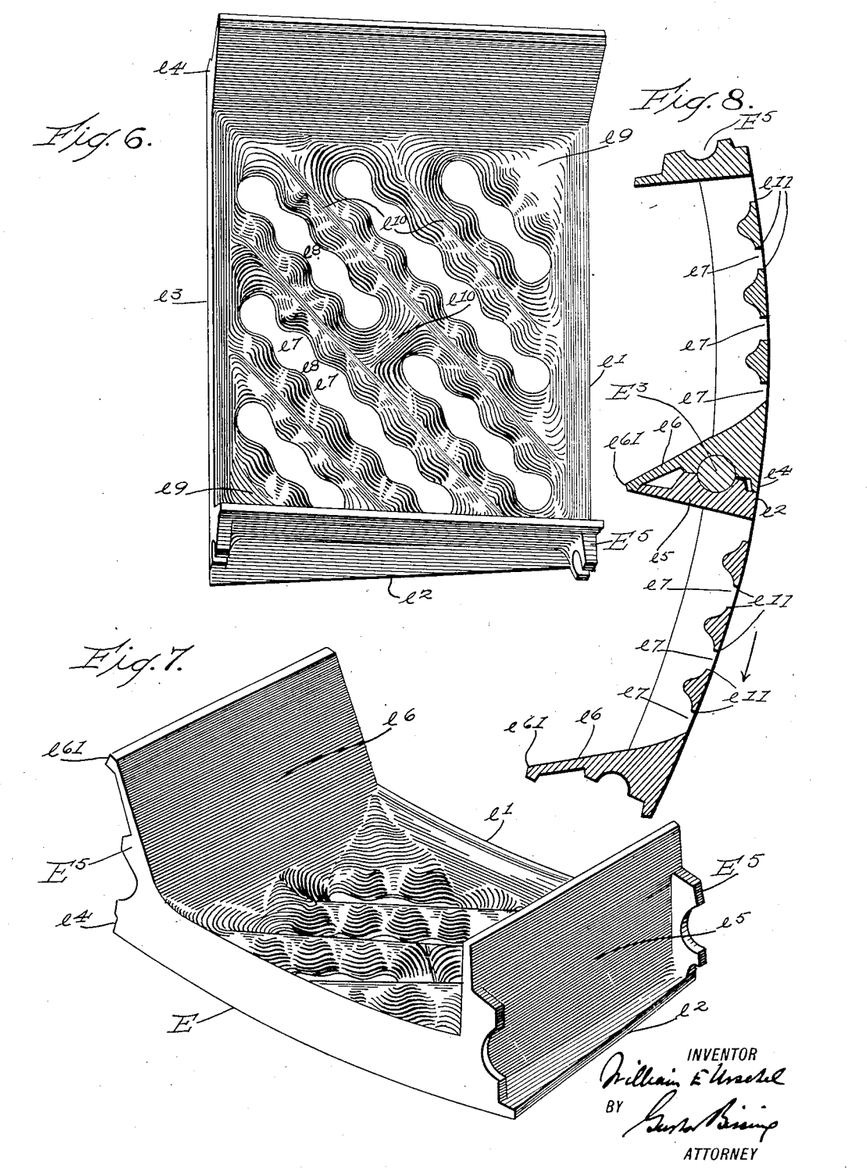
Figs. 6, 7 and 8 shows different views of one or more of my pockets.

The individual pockets are shown in Figs. 6, 7, and 8. They are cast in a single piece, preferably in metal molds. If they are designed to build cylinders composed of a helix of contiguous pockets as distinguished from parallel closed rings of pockets, the vertical side walls $e^1$ $e^3$, though parallel, are not perpendicular but slightly inclined to the end edges $e^2$ $e^4$, so that the lines $e^1$, $e^2$, $e^3$, $e^4$ constitute not a rectangular but a non-rectangular parallelogram. The arrangement of the parts is such that the edge $e^2$ of one pocket abuts against and makes a more or less tight joint with the edge $e^4$ of the contiguous pocket, as seen in Figs. 4 and 8. The wings $e^5$, $e^6$, at the ends of the pockets are arranged so that the upper edge of the wing $e^5$ on one pocket takes under a ridge $e^{61}$ on the upper edge of the wing $e^6$, the two wings $e^5$, $e^6$ thus forming a wedge which acts to upright the bean or to direct the bean ends into the snipping perforation, after the manner of the wedge-shaped part 21 in my patent above referred to. The outer surface E of the pockets, through which the perforations pass, is made on a curved or cylindrical surface having a diameter equal to that of the cylinder which it is intended to build from the pockets. These various features are intended to make it possible to put a long series of pockets end to end, with the edges $e^2$, $e^4$, of adjacent pockets abutting, or nearly abutting, to compose a set of turns, in this case of a coil or helix of pockets, the vertical side walls $e^1$ of one turn of the helix lying against the vertical side walls $e^3$ of the adjacent turn of the helix with a segment, to be hereafter described, between. In this way we build a cylinder with an unbroken or practically unbroken surface.

By examining Fig. 8, we find that the wedge between two contiguous pockets constituted by the wings $e^5$, $e^6$ have one face, $e^5$ in a practically radial direction and the other face $e^6$ sloping away from the radius in the direction of rotation of the pockets. The rotation being clockwise, it will be recalled from my former patent, that the beans fall in cascades down the inner face of the left hand side of the cylinders, and the slope of the advancing face of a given pocket is toward the direction of rotation, being so taken that the bean is permitted to slip by it; but the slope of the other following face $e^5$ is more or less radial being so chosen as to act to stop the bean and catch it in the pocket. These slopes have been chosen by me after much experimentation to get the best results.

In order to hold the several pockets in place in the helix, the outer surface of which is perforated and cylindrical, ears $E^5$ are provided at opposite ends of the pockets, the ears here shown being open, it being readily understood that other types of ears may also be used. The cylindrical rods $E^3$, which connect the two cylinder heads $E^2$ at the ends of the cylinder, pass through the openings in the ears and hold them in place in a manner which will hereafter be more fully described.

The exact construction of the inside of the pocket which I am about to describe is of great importance for upon it depends the facility with which the bean-ends enter the snipping apertures, which determines the maximum number of bean ends to enter these perforations and the percentage of beans which are actually snipped in a given number of pockets. The form of the inside of the pocket which I have here illustrated is the result of repeated trials and has been found most efficient.

It will be observed that the perforations $e^7$ are more or less rounding, which is preferable to a square shape, though not essential. Two adjacent perforations $e^7$ however, are connected by a narrow slot $e^8$ and this is most important because it continually happens that a short length of the stem of the bean remains attached to the bean end. Now although the size of the aperture is so chosen that the tapered end of the bean end can easily pass through by the required amount, the bean-stem which is long and may lie cross-wise cannot pass through. But the bean stem can and does readily pass through the slot $e^8$, which connects two apertures. As a result, my construction of orifice, being in effect, two apertures of gaging size, connected by a narrower slot or a series of apertures connected by narrower slots is almost as effective on beans with stems as on beans without stems. It is of special importance in my cylinder where gravity is the only force to pull the beans into the orifices. At this point attention is directed to the fact that the bounding walls of the slot $e^8$ are rounded and not straight, I having discovered that such rounded walls at the slot give a larger percentage of protruding bean-ends.

I have also found it highly important to construct the inside of the pocket with no straight edges, points or corners on which the ends of beans may catch and be stopped from entering the snipping orifices. Looking down upon the inside of the pocket, as in Fig. 6, all the surfaces are of a rounding or curved nature. For instance, the surface of the fillings $e^9$ at opposite corners of the pocket are like the gradually rounding slope of a hill. Again from the straight ridges $e^{10}$, there descend slopes to the orifices at the bottom which are on gradually curving lines. The rounding surface above any one given aperture is, in a general way, part of a cone and more specifically a part of a cup in its shape. But two adjacent cones or cups merge into each other on curving lines. All these features are of considerable importance and were adopted by me only after many trials.

I finally call attention, in Fig. 8, to the fact that the bottom of the cone or cup is connected to the outer cylindrical or counter cutting surface of the pocket by a short neck $e^{11}$, which may be cylindrical. I have found this neck of importance in order to keep the size of the gaging aperture the same in spite of the fact that the outer cylindrical surface of the rotating cylinder wears down because of the friction of the knife against it.

I come now to a description of the construction of my cylinder. As before outlined, the cylinder is built of a series of turns of pockets, preferably as a helix of pockets, assembled end to end, the helix having a number of turns, as will be clear by considering Figs. 4, and 5. There are two solid cylindrical end-plates $E^2$ (Fig. 11) with sunken, circular tracks $e^{21}$ to rest upon the travelers $a$, one at each end of the machine (Fig. 1) through which end plates $E^2$ pass longitudinal rods $E^3$, the pockets, with their ears $E^5$, being slipped between the rods $E^3$ and being held in place by them. By examining Fig. 5, on the left, we find three pockets, with ears $E^5$, one pocket between two rods. Fig. 8 also shows this construction. Between adjacent helical turns of the pockets, I arrange sheet metal segments $E^6$ which project radially inwardly beyond the limits of the pockets, as clearly illustrated in Figs. 4 and 5, also in Fig. 2, and are provided with apertures to slip over the rods $E^3$.

Figure 5:
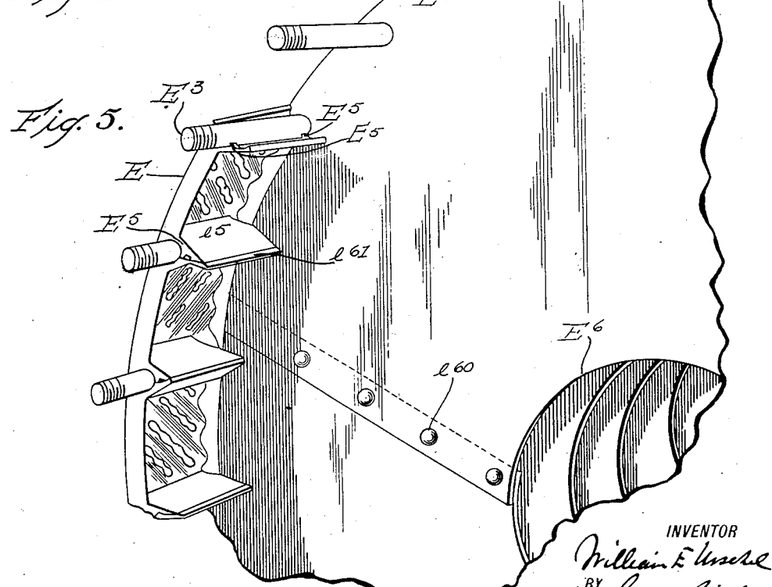
Fig. 5 shows an enlarged view of the end of this drum.

To build up the cylinder, I begin by taking one end ring $E^2$ previously provided with apertures for the rods $E^3$. I now pass the rods through the apertures. I then put in place a single helical turn of pockets, by slipping them severally between the rods (Figs. 4, 5). I now take the sheet metal segment $E^6$, (Fig. 12) which are generally made somewhat less than one half a circumference and which are provided with cylindrical apertures each of the diameter of the rods $E^3$, which apertures are spaced apart circumferentially corresponding to the spacing apart of the rods $E^3$. This segment is then slipped down over the rods $E^3$, the rods being made to pass through the apertures in the segments, until the segment lies flat and firm against the walls $e^1$ of the helical row of the pockets E which have just been put in place. Thereupon a second segment, covering an adjacent set of rods, is put into place and the overlapping adjacent ends of these segments are secured together by rivets $e^{60}$. The fact of the overlap of the ends of the segments is indicated by dotted lines in Figs. 4 and 5. After this another spiral turn of pockets E is laid down, one pocket between each two rods, and another set of segments $E^6$ is slipped over the rods $E^3$ to lie flat upon such second row of pockets, the overlapping ends of the segments being again riveted so as to convert these segments into a continuing turn of an Archimedean screw. The overlap in one turn breaks joints with the overlaps in adjacent turns which avoids systematic errors which would affect the cylindricity. Finally, when all of the pockets and segments have been built into the cylinder, the second end-ring $E^2$ is passed over the rods $E^3$, nuts are passed over the screw threaded ends of these rods $E^3$ and are screwed down tight so that the whole structure of end rings, pockets and segments is converted into a solid cylindrical structure.

I have now to describe the support of my cylinder, which carries the two travelers $a$, on which the cylinder is mounted and rotates, the travelers running on the sunken circular tracks $e^{21}$ of the cylinder heads or ends $E^2$. The supporting frame consists of legs A connected by angle irons $A^1$ bearing four standards $A^2$. In the two standards $A^2$, at the drive end, is mounted the shaft carrying worm gear $B'$ (Fig. 2) to which shaft is attached the driving pulley $B^2$ and the gear $B^3$ which meshes with the gear $B^4$. This gear $B^4$ drives the shaft $B^{40}$, which carries the gears $B^5$ and $B^6$, the gear $B^6$ meshing with the gear $B^7$ which rotates the shaft to which is secured the crank disk $C^2$. Again the gear $B^5$ meshes with the gear $B^{55}$ which is mounted on a shaft $B^{50}$ which supports and drives the eccentric $C^1$. It is understood that the worm-gear $B^1$ meshes with the gear $E^1$ which is secured to the cylinder head $E^2$ by suitable bolts.

From all of this it will appear that by applying power to the pulley $B^2$, we rotate the worm gear $B^1$ and thereby turn the gear $E^1$ and thus rotate the bean-snipping cylinder. On the other hand by a train of gears $B^3$, $B^4$, $B^6$, $B^7$, we rotate the eccentric $C^2$ and by the train of gears $B^3$, $B^4$, $B^5$ and $B^{55}$, we rotate the eccentric $C^1$.

The crank disks or eccentrics $C^1$ and $C^2$ are each of the usual construction and they act to reciprocate the pitmen $C^3$ which are adjustably connected thereto at $C^4$ in a manner which is old and need not here be further described. Such pitman $C^3$, (Fig. 1) in turn, imparts a reciprocating motion to a slide $C^4$ (Figs. 9 and 10) which runs in tracks $C^5$, $C^6$, the lower track $C^6$, being adjustable by a screw $C^{10}$. These tracks, it will be seen, are supported from the angle iron $C^7$ which is fastened, at each end, (Fig. 1) to projections from the legs $A^2$ of the frame A.

To a pair of slides $C^4$ at the front and back of the machine, I secure a knife $C^8$ in a flexible or spring pressed manner. To this end there are brackets $C^9$ which project from the slide $C^4$ and to the upper bracket $C^9$ is pivoted, at $C^{10}$, an arm $C^{11}$. This arm $C^{11}$, in connection with its partner at the other end of the machine, carries the knife $C^8$ in a manner to be now described. There is a tube $C^{12}$ to act as a light stiffening medium around which is bent a piece of sheet iron $C^{13}$, to the two edges of which is fastened the knife $C^8$ by rivets or otherwise. The knife $C^8$ and sheet metal $C^{13}$ are secured to a bar $C^{14}$ which runs the length of the machine, the knife $C^8$, sheet metal $C^{13}$ and bar $C^{14}$ constituting one solid structure. The bar $C^{14}$ is now bolted to an extension $C^{15}$ of the arm $C^{11}$, thus securing the knife $C^8$ to the arm $C^{11}$. There is however a series of adjusting screws $C^{16}$ having each lock nuts $C^{17}$, which screws $C^{16}$ bear at various points against the knife to adjust its resiliency, and keep the long knife blade pressed uniformly against the cylinder throughout its length.

Figures 9, 10:
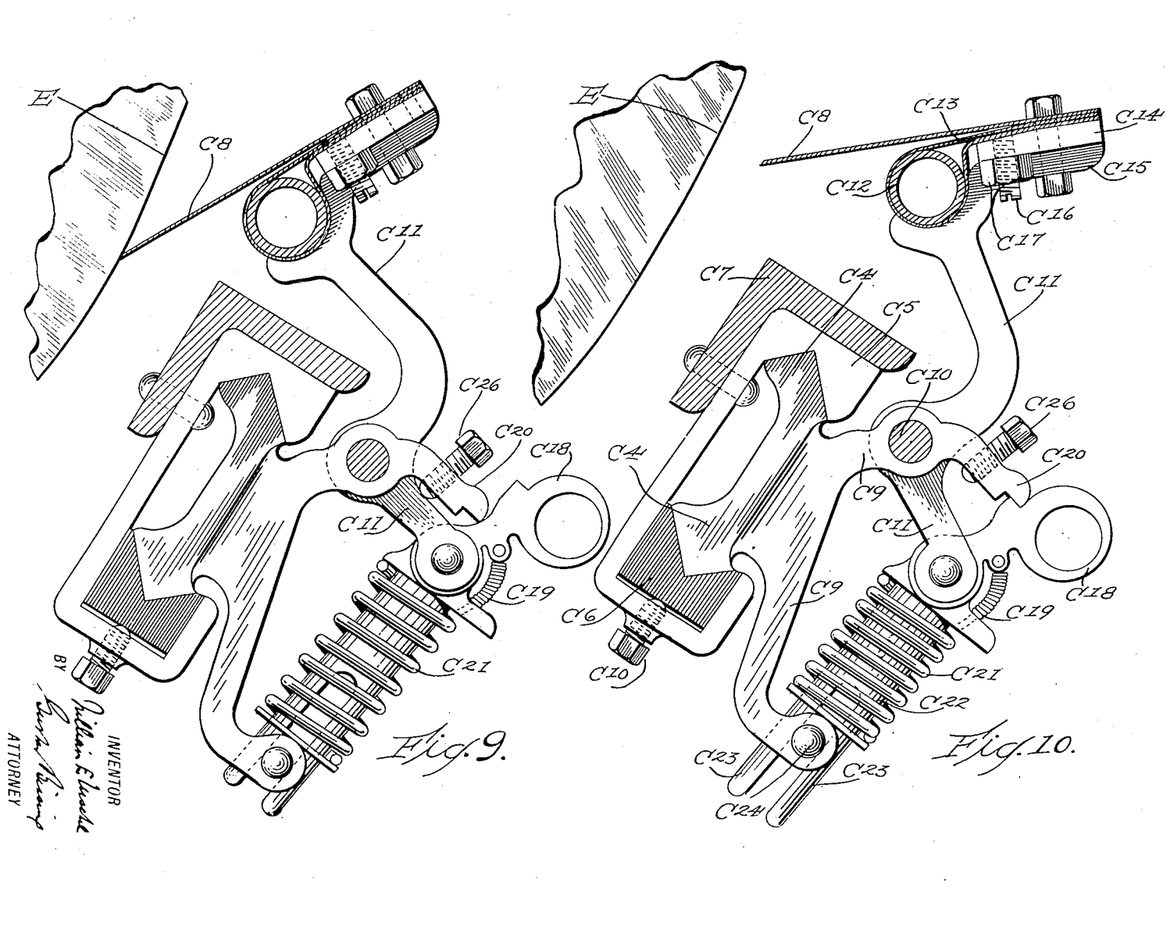
Figs. 9 and 10 show cross sections of my knife support.

The other end of the arm $C^{11}$, which I recall is supported on an extension from the slide $C^4$ at the pivot $C^{10}$, has an extension to which is pivoted a hand hold $C^{18}$, pressed to the left, in Fig. 9, by a spring $C^{19}$, but held from further movement to the left by a catch $C^{20}$. The arm $C^{11}$ on the other hand is pressed so as to force the knife $C^8$ against the cylinder surface E by a spring $C^{21}$, this movement being controlled by the adjusting screw $C^{26}$, in the arm $C^9$. The spring $C^{21}$ is guided by a rod $C^{22}$ having legs $C^{23}$ taking over a pin $C^{24}$ in the lower arm $C^9$.

In the ordinary operation, when beans and beans only are passing through the cylinder, the knife $C^8$ will be forced against the cylinder surface E, as shown in Fig. 9 by the spring $C^{21}$, with a tension determined by the adjusting screw $C^{26}$. This tension can be modified by the series of screws $C^{16}$ acting upon the spring-knife blade $C^8$. Should, however, a nail be accidentally fed into the cylinder and should this nail protrude through one of the snipping apertures, such nail, because of its rapid rotation with the cylinder, will throw the knife away from the cylinder, that is to the position of Fig. 10, compressing the spring $C^{21}$ until the shoulder of the hand hold $C^{18}$ gets below the catch $C^{20}$, when the spring $C^{19}$ will force the hand hold and its shoulder to the left and under the catch $C^{20}$, thus locking the spring $C^{21}$ from expansion and holding the knife away from the cylinder. This knife is now in a position so far removed from the cylindrical surface, that the nail, in its further revolutions with the cylinder, will not again seriously contact with the knife and thus damage it. The operator, on seeing the knife in its withdrawn position, will stop the motion of the parts by unslipping the belt from the drive pulley. The nail will thereupon be removed from the cylinder whereupon the two hand holds $C^{18}$, one at each end of the machine, can be withdrawn from the catches $C^{20}$ permitting the knife again to contact with the cylinder. Motion being again imparted to the drive pulley, operations can be resumed.

It will be noticed that I use two knives, one above and one below. The reason for this is that it sometimes happens that a bean will fall into an aperture of the snipping drum not at the very bottom of the machine, in which case it will not be caught by the lower knife, but part way up the side of the machine in which case the bean will be snipped by my second knife. It is also noticed that I have set my eccentric disks so as to have one knife moving in one direction while the other knife is moving in the other direction, thus balancing the throw.

It will be understood from the above that a pair of sliding supports carries a longitudinally disposed knife which is yieldingly pressed against the snipping cylinder by a spring or springs. In fact this slide carries and thus imparts reciprocating motion to a swinging frame on which the knife is mounted, which swinging frame is yieldingly pressed toward the cylinder, the limit of motion being determined by a stop, the feature of the swinging frame being introduced to permit the knife to be readily thrown beyond their path by any nails or screws which may find their way into a snipping orifice. In this event a catch holds the swinging frame in its withdrawn position until the nail has been removed.

Again it is seen that the groups of snipping apertures appear arranged along elements of the cylinder, that is longitudinally or parallel to its axis, and that, along a line corresponding to the rods, we have a space unprovided with snipping orifices. I so time my reciprocating mechanism as to change the throw, that is to have my knife come to rest, when the knife occupies this bare space, which insures that the knife will be moving longitudinally when in contact with the walls of any of the snipping orifices.

Figure 1:
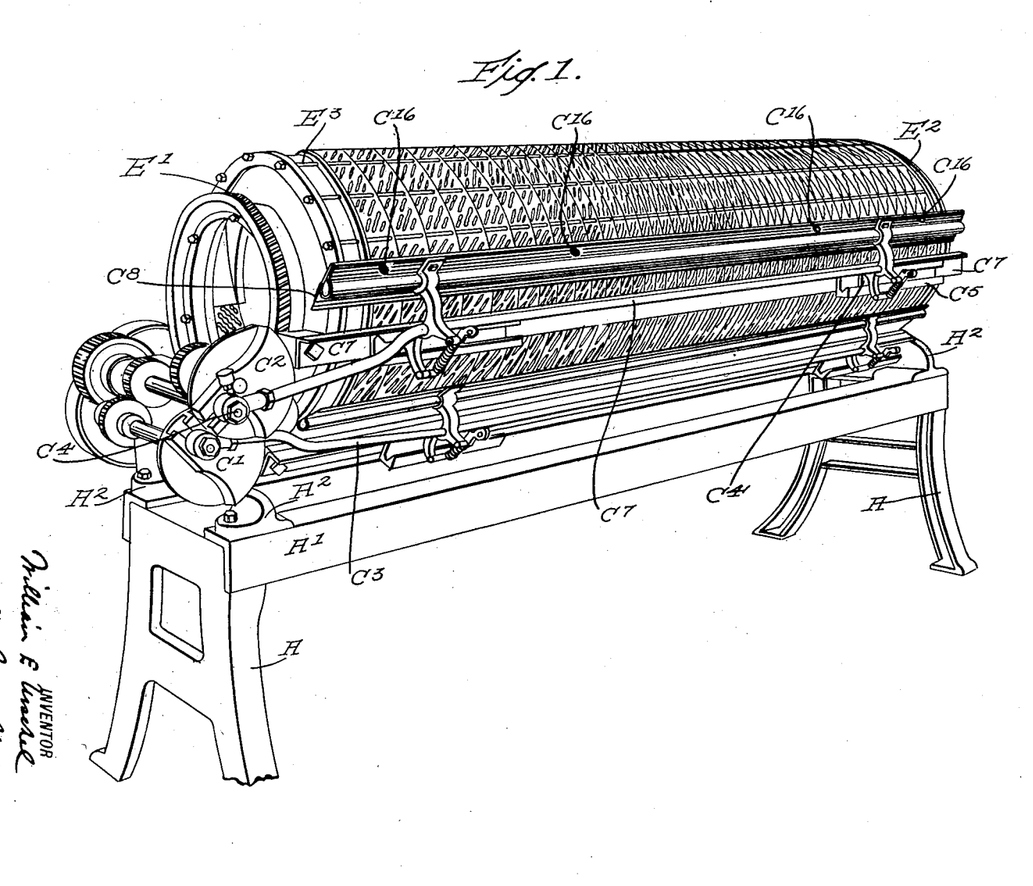
Figure 1 represents a perspective view of my new bean snipping apparatus.
Figures 2, 3, 11, 12:
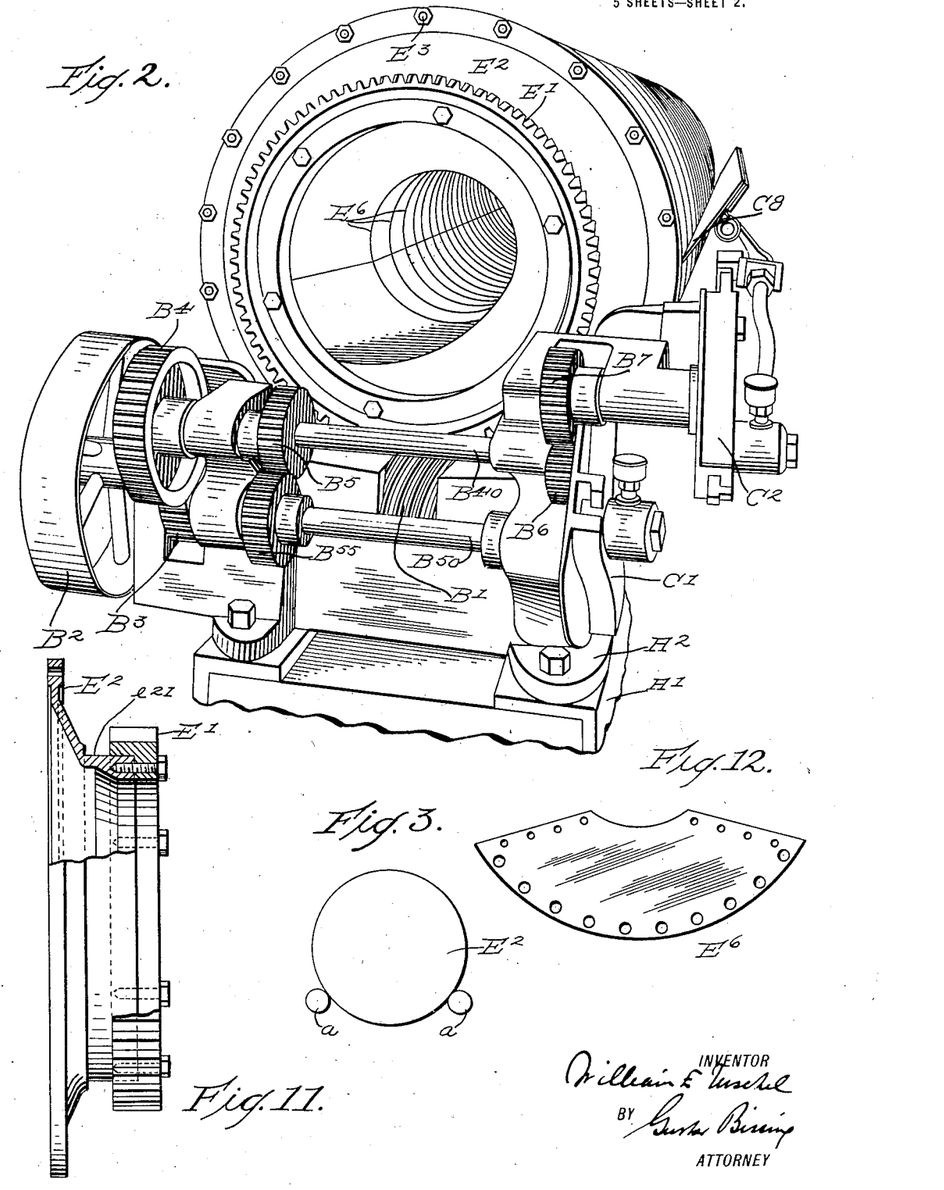
Fig. 2 represents a perspective view taken from the end.
Fig. 3 shows a diagram illustrating the usual travelers for supporting the cylindrical drums.
Fig. 11 shows a longitudinal cross section of my cylinder head.
Fig. 12 shows one of the segments which is to form the Archimedean screw.

Then, too, the line of apertures in any pocket is at an angle, roughly 45°, to the longitudinal element. But since the cylinder is producing motion in a plane at right angles to the axis and the knife moves in the direction of the axis, the resultant effective motion will be on a diagonal to these two directions, that is to say more or less normal to the line of apertures. In Fig. 1, the apertures all run in one direction. In Fig. 4 the apertures run alternately in opposite directions, in successive longitudinal rows. The longitudinal motion of the knife produces a draw cut. The fact that the knife is in actual contact with the cylinder produces a shearing cut. This combination of a draw and shearing cut is most effective in producing a clean cut, especially when it comes to severing the strings, which are often like fine hairs.

It will be noticed from Fig. 4 that the edges $e^2$, $e^4$ of the flanges on the ends of the pockets, which more or less nearly abut when placed in series end to end, are of a shape to lie at an angle to a longitudinal element of the cylinder. This prevents having these abutting edges catch against the knife in their rotation in case of any small irregularity in their construction.

I claim:

1. A string bean snipping cylinder with orifices having tapering side walls terminated by a narrow neck at the outer cylindrical surface, substantially as described.

2. A string-bean snipping cylinder provided with orifices having partially cup shaped side walls, substantially as described.

3. A string-bean snipping cylinder provided with orifices having partially cup shaped side walls terminated by a narrow neck at the outer cylindrical surface, substantially as described.

4. A string-bean snipping cylinder provided with a pair of orifices connected by an open slot, substantially as described.

5. A string-bean snipping cylinder provided with a pair of orifices connected by an open slot having curved bounding walls, substantially as described.

6. A string-bean snipping cylinder having a set of apertures connected by open slots connecting adjacent apertures, substantially as described.

7. A string-bean snipping cylinder having gradually rounding walls constituting adjacent apertures connected by slots, substantially as described.

8. A string-bean snipping cylinder composed of cylinder heads connected by rods, a series of perforated pockets having ears taking on the rods, and wings at each end of each pocket to constitute, when joined, uprighting devices for the beans, substantially as described.

9. A string-bean snipping cylinder composed of pockets, placed end to end, the slope of the inner advancing face of the pocket being toward the direction of rotation, substantially as described.

10. A string bean snipping cylinder composed of pockets, placed end to end, the slope of the inner following face of the pocket being radial, substantially as described.

11. A string-bean snipping cylinder composed of cylinder-heads connected by rods, perforated pockets having ears taking on the rods and vertical side wall, and segments clamped between these walls extending into the cylinder to guide the beans in their rotation, substantially as described.

12. A string-bean snipping cylinder composed of cylinder heads connected by rods, a helical series of pockets supported by the rods, and segments extending into the cylinder clamped between the vertical side walls of the pockets and secured together in series, to constitute an Archimedean feed spiral, substantially as described.

13. A string-bean snipper comprising the combination of a rotary perforated cylinder and a longitudinally moving knife in contact with the cylinder, substantially as described.

14. A string-bean snipper comprising the combination of a rotary, perforated cylinder and a longitudinal, reciprocating knife in direct shearing contact with the cylinder, substantially as described.

15. A string-bean snipper comprising the combination of a rotary, perforated cylinder having its snipper apertures arranged in longitudinal groups with unperforated spaces between, and a longitudinal reciprocating knife timed to move when over the perforations and to change its throw at the unperforated spaces, substantially as described.

16. A string-bean snipper comprising the combination of a cylinder composed of cylinder heads, connecting rods, perforated pockets arranged end to end on the rods, and a longitudinal reciprocating knife timed to change its throw when over the rods, substantially as described.

17. A string-bean snipper comprising the combination of a rotary snipping cylinder, a stand for supporting the same, slides supported on the stand, a swinging, spring pressed frame mounted on the slides, and a longitudinal knife mounted on the swinging frame and pressed against the cylinder, substantially as described.

18. A string-bean snipper comprising the combination of a rotary snipping cylinder, a stand for supporting the same, slides supported on the stand, a swinging spring pressed frame mounted on the slides, an adjustable stop therefor, and a knife mounted on the swinging frame and pressed against the cylinder, substantially as described.

19. A string bean snipper comprising the combination of a rotary snipping cylinder, a stand, slides supported thereon, a swinging frame on the slides, a knife on the frame and a catch for holding the knife away from the cylinder substantially as described.

20. A bean-snipping cylinder composed of a series of perforated pockets, placed end to end, the abutting edges of the pockets lying at an angle to the longitudinal element of the cylinder, substantially as described.

21. A bean-snipping cylinder composed of a series of perforated pockets, placed end to end, the pockets being provided with end flanges shaped to form a more or less close joint when abutted and thus to constitute a substantially unbroken cylindrical surface, substantially as described.

22. The combination of a string-bean snipping cylinder composed of a series of perforated pockets, placed end to end, the abutting edges of the pockets lying at an angle to the longitudinal element of the cylinder and a longitudinal reciprocating knife in shearing contact with the cylinder, substantially as described.

In testimony whereof, I have signed my name to this specification, in the presence of two subscribing witnesses.

WILLIAM E. URSCHEL.

Witnesses:
  EDGERTON W. AGAR,
  F. W. MORTON.